No. 776,801.                                   Patented December 6, 1904.

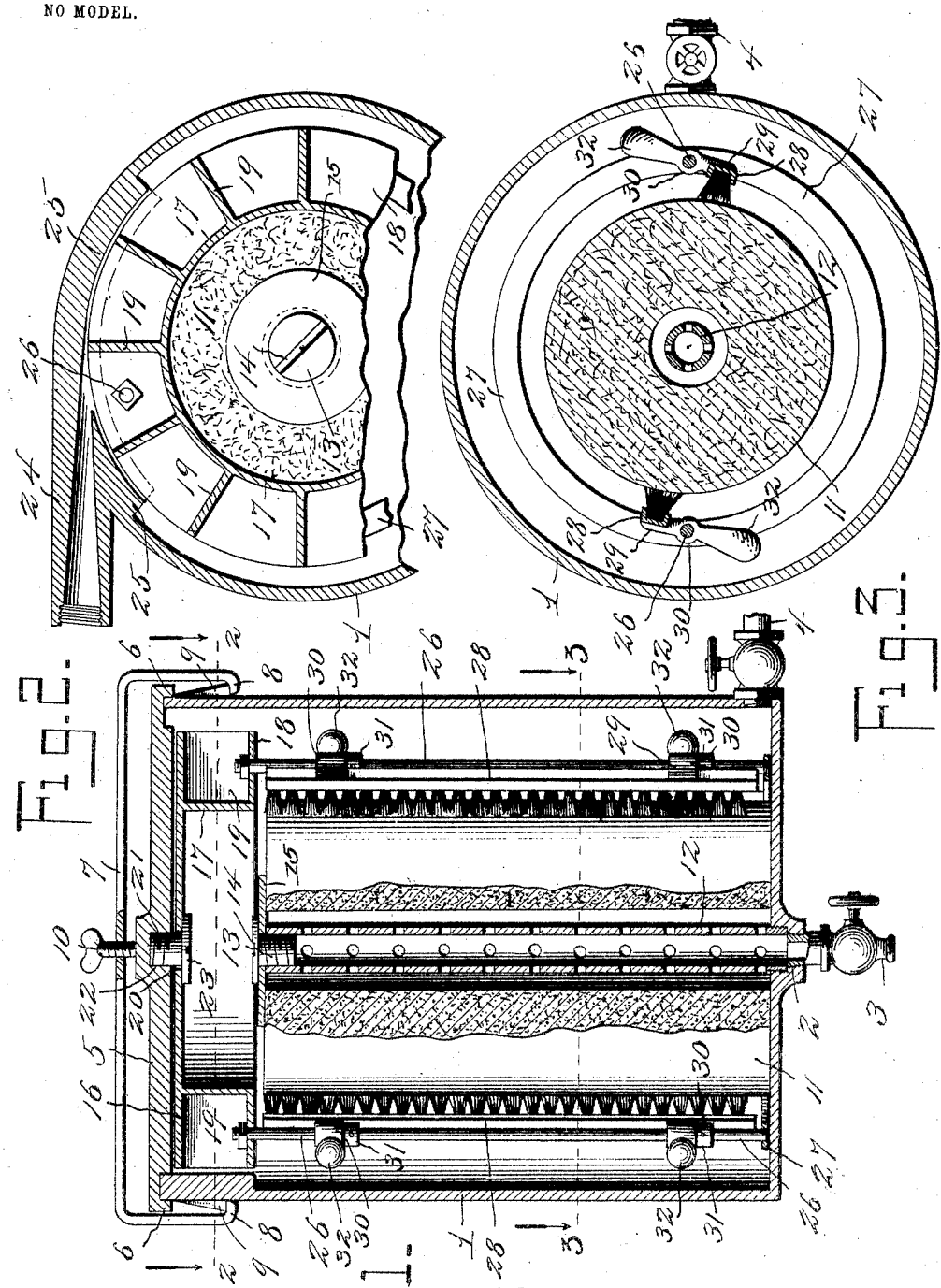

UNITED STATES PATENT OFFICE.

LLOYD V. ROOD, OF MARIETTA, OHIO.

FILTER.

SPECIFICATION forming part of Letters Patent No. 776,801, dated December 6, 1904.

Application filed April 27, 1904. Serial No. 205,151. (No model.)

*To all whom it may concern:*

Be it known that I, LLOYD V. ROOD, a citizen of the United States, residing at Marietta, in the county of Washington and State of Ohio, have invented a new and useful Filter, of which the following is a specification.

This invention relates to filters of that class wherein cleaning-brushes are automatically actuated by the passage of water through the filter, and has for its object to provide improved means for actuating the brushes which is carried by the cover of the filter and is capable of being conveniently applied and removed therewith without disturbing any of the other elements of the filter.

Another object of the invention is to provide for automatically taking up wear of the brushes, so as to maintain the latter in effective frictional contact with the filtering element.

It is furthermore designed to provide for supporting the filtering element entirely independent of the cleansing apparatus and to permit of the convenient application and removal thereof.

With these and other objects in view the present invention consists in the combination and arrangement of parts, as hereinafter more fully described, shown in the accompanying drawings, and particularly pointed out in the appended claims, it being understood that changes in the form, proportions, size, and minor details may be made within the scope of the claims without departing from the spirit or sacrificing any of the advantages of the invention.

In the drawings, Figure 1 is a longitudinal sectional view of a filter embodying the features of the present invention. Fig. 2 is a detail sectional view on the line 2 2 of Fig. 1 to illustrate the inlet of the filter. Fig. 3 is a similar view on the line 3 3 of Fig. 1.

Like characters of reference designate corresponding parts in each and every figure of the drawings.

The body 1 of the present filter is preferably in the form of a cylindrical casing, which is provided in its bottom with a centrally-located screw-threaded opening 2, with which a valved draw-off pipe 3 is connected. A draw-off pipe 4 pierces one side of the casing near the bottom thereof for the purpose of drawing off the unfiltered water, as will be hereinafter explained. The open top of the casing is normally closed by means of a cover 5, which has a pendent cylindrical flange 6 to snugly embrace the casing and is removably connected to the latter by means of a clamp 7, which extends diametrically across the top of the cover and has hooked or inturned terminals 8, which engage beneath an annular flange 9 upon the casing. A suitable set-screw 10 pierces the clamp 7 at the middle thereof and bears upon the top of the cover, so as to draw the latter snugly against the top of the casing.

Located centrally within the casing is an open-ended tubular filtering element 11, formed of some suitable porous material, with its lower end supported upon the bottom of the casing and embracing the opening 2 therein. An open-ended perforate pipe 12 is fitted loosely within the filtering element and has its lower end externally screw-threaded and fitted into the screw-threaded opening 2 in the bottom of the casing, while its upper end is internally screw-threaded for the reception of a headed screw-threaded plug 13, which has a screw-driver seat 14 in the top thereof for convenience in applying and removing the plug. A suitable washer 15 embraces the plug and rests upon the top of the filtering element, so as to close the open top of the bore thereof to prevent unfiltered water from having direct access to the interior of the filtering element through the top of the bore thereof.

A water-wheel is mounted to rotate in the space between the top of the filtering element and the cover of the casing and comprises a disk or circular plate 16, located immediately beneath the cover and provided with a pendent cylindrical rim 17, located at a suitable distance inwardly from the outer peripheral edge of the plate and having an outwardly-directed flange or ring 18, carried by the lower edge of the rim. Radially-disposed blades or paddles 19 extend outwardly from the rim 17 and between the plate 16 and the flange 18. At the center of the disk or plate 16 there is an opening 20 for the loose reception of a screw-threaded pivotal support 21, which engages a screw-threaded socket 22 in the under side of the cover and has a head 23 at its lower end to engage the under side of the plate and rotatably support the water-wheel upon the cover. At one side of the top portion of the casing there is a tangential inlet-nozzle 24, which has its water-passage tapered inwardly and in communication with the peripheral edge of the water-wheel, so that the incoming water is designed to strike the paddles of the wheel and thereby rotate the latter. Underlapping the outer edge of the water-wheel is a guard-flange 25, which is carried internally by the casing at the under side of the nozzle, so as to prevent the incoming water from passing downward between the periphery of the water-wheel and the casing without tending to actuate the wheel.

For the support of the means which are designed to clean the exterior surface of the filtering element there is a frame comprising uprights 26, which are carried by the water-wheel and depend from the ring or flange 18, the lower ends of these uprights being connected by a ring 27, which is located in the annular water-space between the filtering element 11 and the casing of the filter. At the inner side of each upright there is a cleansing device 28, preferably in the nature of a brush, which is provided with upper and lower laterally and outwardly directed arms 29, which terminate in bearing-sleeves 30, rotatably embracing the adjacent upright and supported upon the annular shoulders 31, carried by the upright. Each of the bearings 30 is provided with a radially-disposed weight 32 set at an angle to the adjacent arm 29, so as to tend to swing outwardly by centrifugal force and thereby normally maintain the brush in frictional engagement with the exterior surface of the filtering element, whereby wear upon the bristles of the brush will automatically and effectually be taken up.

In the operation of the filter the water enters the nozzle 24 and passes into the outer annular water-chamber formed between the filtering element 11 and the casing 1, after which it percolates through the filtering element and into the perforate tube 12, from which it may be drawn by means of the valved pipe 3. When sediment has accumulated upon the exterior surface of the filtering element sufficient to impair its filtering function, the draw-off valve 4, which is in communication with the annular chamber containing the unfiltered water, may be opened, so as to permit of the free escape of the unfiltered water, and thereby permit of the free inrush of water through the nozzle 24 and against the paddles of the water-wheel, the latter thereby being rotated with sufficient rapidity to cause the brushes to effectually remove all sediment from the exterior of the filtering element. When the water-wheel is rapidly rotated, the brushes will be firmly pressed against the filtering element under the centrifugal action of the weights 32, and wear upon the bristles of the brushes will thereby be taken up.

An important feature of the present device resides in the fact that the cleansing apparatus is supported independently of the filtering element, and therefore the latter is relieved of strains caused by the rapid rotation of said cleansing apparatus. Moreover, the cleansing apparatus is carried by the cover of the filter and is removable therewith without disturbing the filtering element, and the latter may be replaced without necessitating the disconnection of the cleansing apparatus from the cover of the filter.

Having thus described the construction and operation of my invention, what I claim as new, and desire to secure by Letters Patent, is—

1. A filter of the class described having a filtering element and a rotatable cleansing device including a support, a sleeve rotatable upon the support, a brush carried by one side of the sleeve and located between the latter and the filtering element, and a weight carried by the other side of the sleeve to maintain the brush in frictional contact with the filtering element by centrifugal action during rotation of the cleansing device.

2. A filter of the class described having a filtering element and a cleansing device mounted to rotate concentrically with respect to the filtering element and including a rod disposed in substantial parallelism with the filtering element, a brush pivotally carried by the rod and located between the latter and the filtering element, and a centrifugal weight connected with the brush to maintain the latter in frictional contact with the filtering element during rotation of the cleansing device.

3. A filter of the class described having a filtering element, a water-wheel mounted to rotate concentrically with respect to the filtering-wheel, a rod carried by the water-wheel and disposed in substantial parallelism with the filtering element, a brush pivotally carried by the rod between the latter and the filtering element, and a centrifugal weight connected with the brush and located at the opposite side of the rod.

4. A filter of the class described having a filtering element, a water-wheel mounted to rotate concentrically with respect to the filtering element, rods carried by the water-wheel and disposed in substantial parallelism with the filtering element, a ring loosely embracing the filtering element and connecting the outer ends of the rods, sleeves rotatable upon the rods, brushes carried by the sleeves and located between the rods and the filtering element, and centrifugal weights carried by the sleeves.

5. A filter of the class described comprising a casing, a tubular filtering element within the casing and terminated short of the top thereof, a water-wheel mounted to rotate within the space between the top of the filtering element and the top of the casing, rods depending from the water-wheel at opposite sides of the filtering element, a ring loosely embracing the filtering element and connecting the lower ends of the rods, sleeves rotatable upon the rods, brushes connected to the sleeves and located between the latter and the filtering element, and centrifugal weights carried by the sleeves.

6. In a filter, the combination of a casing having an outlet in one end thereof, a removable cover for the opposite end of the casing, an open-ended tubular filtering element in communication with the outlet of the casing, an open-ended perforate tube within the filtering element and detachably connected to the casing at the outlet thereof, means detachably connected to the opposite end of the perforate tube to close the latter and the adjacent end of the filtering element and engaging said element to detachably hold the same in place, a water-wheel carried by the cover independently of the filtering element, rods pendent from the water-wheel, sleeves rotatable upon the rods, brushes carried by the sleeves between the two rods and the filtering element, and centrifugal weights carried by the sleeves.

In testimony that I claim the foregoing as my own I have hereto affixed my signature in the presence of two witnesses.

LLOYD V. ROOD.

Witnesses:
   ETTA HUNTER,
   FRANK BICKERT.